Feb. 21, 1950
N. W. OAKES
2,498,293
OSCILLATING DRIVE MECHANISM
Filed Aug. 29, 1947
2 Sheets-Sheet 1
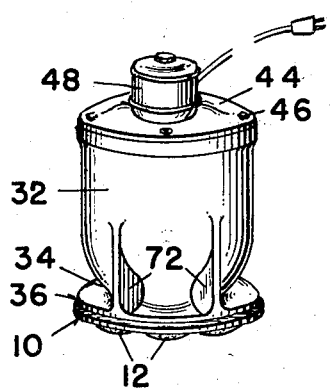
FIG. 1
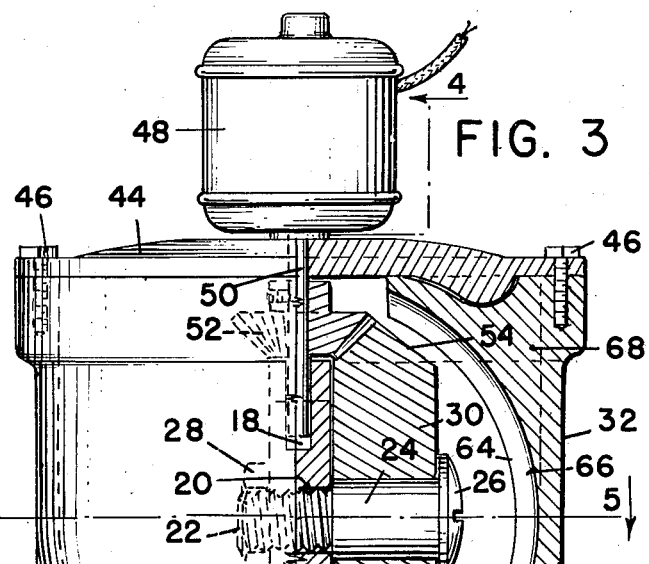
FIG. 3
FIG. 2
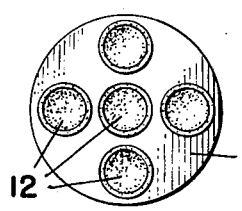
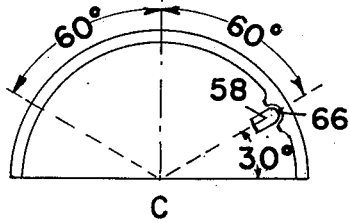
FIG. 6
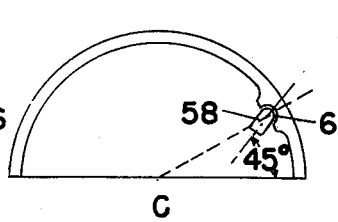
FIG. 7
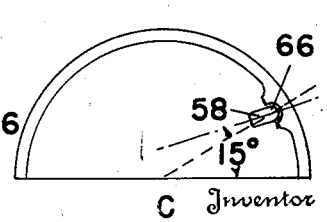
FIG. 8
Inventor
N. Waller Oakes,
By *Patrick A. Hume*
Attorney Feb. 21, 1950 N. W. OAKES 2,498,293
OSCILLATING DRIVE MECHANISM
Filed Aug. 29, 1947 2 Sheets-Sheet 2

Inventor
N. Waller Oakes,
Attorney

Patented Feb. 21, 1950

2,498,293

UNITED STATES PATENT OFFICE 2,498,293

OSCILLATING DRIVE MECHANISM

Nathan Waller Oakes, Cleveland, Ohio, assignor of five per cent to Horace W. Peters, Cleveland, Ohio, and five per cent to Patrick H. Hume, Washington, D. C.

Application August 29, 1947, Serial No. 771,315

10 Claims. (Cl. 74—70)

This invention relates to oscillating agitator mechanisms, and is especially directed to a portable agitator which may be applied as desired to any container or other situs of application to agitate and circulate the contents thereof in an improved manner. As a related matter, the invention embraces an improved mechanical movement and novel power transmission device by which the various ends of the invention may be served in novel and distinctive ways.

It is accordingly the principal object of the present invention to provide an agitator that may be removably applied to any container where a churning action, and a circulatory action, is desired, thus to adapt any familiar receptacle, such as a wash tub, sink, bucket, mixing vessel, and the like, to the purposes usually assigned to washing machines, churns, mixers, etc., that are especially built for this purpose.

It is a related object to provide an agitating device of simple construction which is adapted to oscillate about a relatively fixed axis in such manner that the axial velocity of movement in one direction is greater than the axial velocity in the other, thereby to effect greater impulsion of the substance being agitated in the one direction than in the opposite direction, whereby a net unidirectional circulatory tendency is sustained.

It is a further object to provide a mechanical movement of such novel characteristics that unidirectional revolutionary motion is converted into oscillatory motion of different half cycle periodicity each cycle.

These and related objects and advantages are either explicit or implicit in the following specification and claims, as will be more readily understood by reference to the annexed drawings in which:

Fig. 1 is a perspective view of a device constructed in accordance with a preferred form of the invention.

Fig. 2 is a bottom plan view of the device shown in Fig. 1.

Fig. 3 is an enlarged view of the device shown partially in elevation and partially in vertical mid-section.

Figure 4:
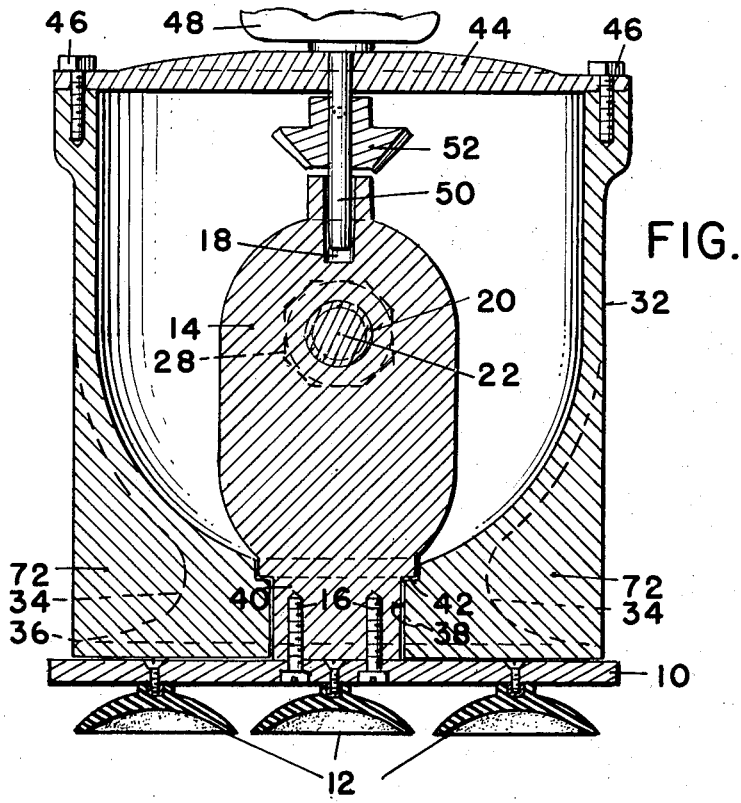
Fig. 4 is a sectional elevational view taken along line 4—4, Fig. 3, regarded from the direction indicated by the arrows.

Figs. 6 to 8, inclusive, are planar diagrams illustrative of certain considerations entering into the construction and arrangement of parts in the drive elements, as will more fully appear hereinafter.

Referring now more particularly to the drawings, in which the same characters of reference refer to corresponding parts throughout the several figures, in its preferred form, the invention comprises a base plate 10, which may be sufficiently heavy, per se, to hold the device in position without creepage when operating, but which is preferably lightly constructed for ready portability. In the latter case, suction cups or pads 12 may be provided securely to anchor the base to its surface of association. Any suitable means for this purpose is intended.

Fastened centrally of the base 10 is a post 14 which may be either fashioned integrally with the base as a one piece casting, or may be secured thereto as by suitable fastenings 16; in either event, so as to stand normal to the base in fixed relation thereto. Any suitable connection between post and base which will give effect to this is within the purview of the invention.

The post 14 is provided with a coaxial vertical counterbore 18 at its upper end, and a horizontally extending bore 20 intermediate its ends for purposes presently to appear. The upper bore 18 may terminate short of the bore 20, or may extend through the post down to any point, including its bottom. The horizontal bore 20 passes entirely through the post.

A threaded stud 22 having a smooth bearing portion 24 adjacent its head 26 projects through the bore 20 so that its threaded end may be secured by a nut 28 at the opposite side of the post 14.

Journaled for revolution upon the smooth bearing portion 24 of the stud 22 is a bevel gear 30 of a size sufficient to present an effective area of its teeth above the horizontal plane in which the top of the post 14 is included. Any axial component or thrust realized from the turning of this gear is absorbed by the head 26 of the stud 22 in one direction, and by the confronting portions of the post 14 in the other. The smooth bearing portion 24 may be of sufficient axial dimension to insure that the gear be free-turning without binding upon the stud, irrespective of how tightly the nut 28 may be set-up against the post.

The gear and post are enclosed by an oscillatable casing 32 formed generally cylindrical at its upper half, and being constituted generally hemi-spherically throughout its lower half. Since the casing is hollow, these upper and lower conformations obtain in the interior as well as on the exterior portions of the casing.

A pedestal portion 34, terminating in a foot 36, constitutes the bottom closure of the casing which is such as to overlie the base plate 10 in substantially congruent, slightly-spaced relation thereto. An opening 38 concentrically disposed in the foot 36 of the casing accommodates the post 14, which is provided with a smooth bearing portion 40 for this purpose, about which the casing is adapted to oscillate. An annular shoulder 42 on the post and the base plate 10 define the axial limits of the smooth bearing portion 40, and serve to confine the axial movement of the casing 32 to within these limits.

A cap or closure 44 is bolted to the casing by suitable fastenings 46. Carried centrally of the cap 44 in coaxial relation to the post and casing is a prime mover 48, preferably an electric motor, which is fixed to the cap so as to have no motion independently thereof, except the shaft 50 of the motor which extends in free-running relation downwardly through the cap 44 into the counterbore 18 atop the post 14, where it is journaled axially and radially.

Secured to the motor shaft 50 within the casing just below the cap 44 is a bevel pinion 52 which is in driving engagement with the bevel gear 30 so that as the motor is energized to turn the shaft 50, the bevel pinion 52 is positively turned, thereby to drive the gear 30 positively in one direction.

So far, in the relationship of parts described, no drive or motion has been extended to the casing 32. This is made to oscillate by means coactive between the gear and the casing now to be disclosed.

Figure 5:
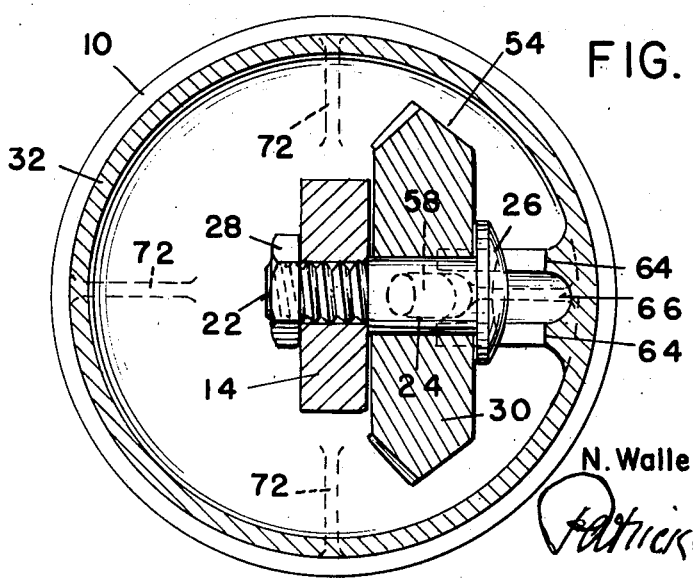
Fig. 5 is a horizontal mid-sectional view taken along line 5—5 of Fig. 3, looking downwardly, as indicated.

As is evident from inspection of Figs. 3 and 5, the gear 30, upon a conical face 54 that is contiguous to the cone of its teeth, and oppositely inclined thereto, is provided with a cylindrical bore 56 which is disposed at such an angularity that its major axis will, upon revolving of the gear, generate an imaginary cone, having its apex at the exact center of the assembly as defined by the intersection of the axis of revolution of the gear 30 (which is coincident with the longitudinal axis of the stud 22), and the axis of oscillation of the casing 32 (which is coincident with the longitudinal axis of the post 14). The angle of slope of cone, relative to the former axis (which is also the cone's axis) is 60°, and, hence, must likewise be 30° relative to the oscillatory (or vertical) axis of the casing. Figs. 6 to 8, inclusive, illustrate this conclusion, as will be later discussed.

Within the cylindrical bore 56 is disposed a crankpin 58, coaxially disposed in sliding engagement therein. The pin 58 is urged outwardly of the bore by virtue of a compression spring 60 which is confined between the inner end of the pin and the bottom (or end) 62 of the bore 56. The purpose of this arrangement will presently appear.

As best viewed in Figs. 3 and 5, an interior portion of the casing 32 confronting the gear 30 is provided with a pair of parallel ridges 64 which cooperate to define a cam groove 66, the long axis of which lies in the radial plane of the casing's axis, and which is curved in that plane to form an arcuate channel, as viewed in Fig. 3, which agrees with the curvature of the hemispherical lower portion of the casing 32, and is continued into the upper half of the latter upon a built-up portion 68 within the cylindrical portion of the casing. The upper and lower limits of the cam groove 66 lie at, or just beyond, the angles defined by the slope of the imaginary cone defined by the axis at the pin 58 when revolved.

The exposed end of the crank-pin 58 is rounded, as at 70, and is engaged within the cam groove 66, which is complementarily rounded throughout the course of its extent to agree with the contour of the pin. It will be seen that the spring 60 urges the pin into positive engagement with the cam groove 64, and maintains this relationship irrespective of the wear of parts and other minor imperfections as may arise. It is also evident that the turning of the gear 30, and the resulting rotation of the crank pin 58 is effective to oscillate the casing throughout an arc of 120°, as shown in Fig. 6, during which cycle, the pin traverses the arcuate cam groove a like amount, as is evident.

Fig. 6 reveals the only angle at which the crank pin may be disposed, since were this angularity greater (see Fig. 7), or less (Fig. 8) its axis could not be produced through the center C of oscillation shown on these figures, and the apex of the cone of rotation would fall at some point eccentric to C to require a smaller spherical orbit, or a larger one, as in the cases of Figs. 7 and 8, respectively. For the device to be operative, then, the axis of the pin must be at that angle to the axis of the gear 30 that is equal to one-half the total angle of travel of the casing 32. In the illustrated embodiment, since this latter angle is 120°, the former angle must be 60°.

It should further be noted that the motor 48, by virtue of being rigidly affixed to the cap 44, oscillates with the casing 32 to which the cap is secured. However, the ratios existent between the driving parts 50 and 52, to the driven parts 30 and 32, are such as to cause the casing to turn in its oscillatory cycle much slower than the motor shaft 50 turns, so that positive torque is always applied to the driven parts irrespective of the direction of movement or disposition of the casing at any given instant. From this it will also be seen that when the casing turns in the same direction in which the motor shaft 50 is turning, there is an increment of gain in turning moment which is additive to the axial velocity of the shaft, and this causes the casing to revolve more rapidly in that direction than would be the case were the motor fixed or turning in the opposite direction. Conversely, in the return phase of the oscillatory cycle just described, the motor is moving bodily in counter-revolution to the turning of its shaft, causing a decrement of loss in the turning moment which is subtractive from the axial velocity of the shaft, and this effects a slower turning of the casing than would be realized were the motor fixed, or the casing revolving in the opposite direction, as previously stated.

From this novel arrangement, the very important result of effecting oscillation at an accelerated periodicity every other half cycle is derived without diminishing the amplitude of the motion, so that greater impulsion is realized in the one direction than in the other, and a net unidirectional, or circulatory, impulse is sustained in the medium of application.

To assist in the agitating function, webs or fins 72 are disposed outwardly of the casing 32 in any suitable placement and number. In the illustrated embodiment, four fins are shown as diametrically opposed webs disposed in the recess formed by the pedestal 34 of the casing, and extending between the casing proper and its foot portion 36.

If it appears desirable, the casing may be sealed and filled with oil to lubricate the bearings of the moving parts, in which case, anti-friction bearings may be used. It is preferred, however, that the weight and cost of the device be minimized, whereby an open casing is desirable through which the fluid being agitated may circulate to afford lubrication for the oil-less, plain-type of bearings employed for this purpose. Suitable ducts or vents (not shown) may be allowed through the base plate, casing foot, and casing for this purpose, not only to insure adequate lubrication, but to effect proper drainage of the interior after use.

The mechanical movement herein described will find application to any use where oscillatory motion is desired. One such use that readily suggests itself is that of vehicular windshield wipers. In such a use, the oscillatory axis will be horizontal, or substantially so, and the driving means may be stationarily mounted with respect to the oscillatory casing to afford a constant speed of oscillation in both directions if this is preferred in the particular use contemplated. Electric fan oscillating means could embody this principle to advantage, whether for constant speed or variable speed oscillation. Any and all adaptations similar to these are within the purview of the invention as is apprehended in and by the following claims.

I claim as my invention:

1. A portable agitator comprising a base, a post vertically erected on said base, a gear journalled with its revolutionary axis horizontally disposed upon said post, a casing pivotally disposed around said post, a vertically extending arcuate cam carried upon the interior of said casing so as to confront said gear, a crank-pin carried by said gear interengaged with said cam, and means for revolving said gear to oscillate the casing.

2. The invention of claim 1 wherein said crank pin is disposed with its major axis at an angle to the axis of revolution of said gear that is equal to one-half the angle through which said casing is oscillated.

3. The invention of claim 1 wherein said gear-revolving means is carried by the oscillatable casing.

4. A portable agitator comprising a base, a hollow body portion oscillatable upon said base, a cam element carried interiorly of said body portion, said cam element having its major axis in a plane of the axis of oscillation of said body portion, and being curved to constitute an arc subtended by said oscillatory axis when produced, a revoluble element disposed within said body portion having its axis of revolution normal to the oscillatory axis, a crank pin carried by said revoluble element for coaction with said cam element, the major axis of said pin, if produced, extending to the point of intersection of the revolutionary and oscillatory axes, aforesaid, and means for driving said revoluble element.

5. The invention of claim 4 in which said driving means is mounted upon the body portion with the axis of drive coincident with the oscillatory axis thereof.

6. Mechanical motion means for converting revolutionary motion to oscillatory motion comprising revolutionary motion means including a crank pin angularly disposed so that its major axis, when produced, generates a conical orbit when the pin is rotated about a fixed axis, a drive means for said revolutionary motion means having the main axis of drive normal to said fixed axis, and adapted, when produced, to intersect the latter at the apex of the conical orbit of the pin thereupon, oscillatory motion means including an arcuate cam arranged in chordal relation to said drive axis and cooperating with said crank pin so that, as the latter is rotated, the arcuate cam is oscillated about the drive axis to generate a spherical path.

7. Mechanical movement for deriving oscillatory motion from revolutionary motion which includes, a revoluble element adapted to revolve about a fixed axis of revolution, an oscillatable member adapted to oscillate about a fixed axis of oscillation which intersects the axis of revolution of said element in perpendicular relation thereto; a cam element arranged for coaction between the revoluble element and the oscillatable member, the long axis of the cam element being disposed in a plane which includes the axes of revolution and oscillation when the oscillatable member is in zero position of the oscillation cycle; said cam element being curved in said plane to define an arc whose center is substantially coincident with the point of intersection of the axes of revolution and oscillation; and a cam follower interengaged between the revoluble element and the cam element, said cam follower being projected along an axis which when produced intersects the point of intersection of the axes of revolution and oscillation, whereby, when the revoluble element is revolved, the cam follower sweeps the cam element throughout its major extent to oscillate the oscillatable member.

8. Mechanical movement for deriving oscillatory motion from revolutionary motion which includes an oscillatable casing, a cam disposed within said casing having its longitudinal axis extended in a plane which includes the axis of oscillation of said casing, said cam being curved in said plane into an arc scribed from a center proximate to the axis of oscillation; a revoluble element confronting said cam having a crank portion in engagement therewith; the longitudinal axis of said crank portion always lying within a plane of the axis of oscillation of said casing, irrespective of the degree of rotation of said revoluble element.

9. Mechanical movement for deriving oscillatory motion from revolutionary motion which includes revoluble means defining a crank, and oscillatable means defining a yoke; said crank and yoke being constructed and arranged for mutual coaction so that when the revoluble means is revolved, the crank and yoke will oscillate the oscillatable means about its oscillatory axis; said yoke being curved in a plane of said axis to radii emanating from a common center on said oscillatory axis, and being disposed so that its median radius is included in a plane of the revolutionary axis of said revoluble means; said crank extending into engagement with said yoke at such an angle that its longitudinal axis always lies within a plane in which the oscillatory axis and said yoke are included.

10. Oscillatory motion means comprising a housing adapted to oscillate upon a relatively vertical axis; a revoluble element within said housing adapted to revolve about a fixed, relatively horizontal axis which intersects the vertical axis; an arcuate yoke connected to said housing in confronting relation to said revoluble element, the median axis of said yoke lying in a plane of said vertical axis and being curved in said plane to an arc having as its center the point of intersection of said relatively vertical and horizontal axes, the effective portions of said yoke extending for 60 degrees to each side of the horizontal plane in which the relatively horizontal axis lies; and a crank engaging said yoke carried by said revoluble element and adapted to be rotated thereby, the axis of the crank rotating through a conical orbit having as its apex the point of intersection of the relatively vertical and horizontal axes.

N. WALLER OAKES.

REFERENCES CITED

The following references are of record in the file of this patent:

UNITED STATES PATENTS

| Number | Name | Date |
|---|---|---|
| 763,073 | Rudd | June 21, 1904 |
| 1,563,305 | Ambler | Nov. 24, 1925 |
| 1,721,956 | Hoff | July 23, 1929 |
| 2,212,872 | Barker | Aug. 27, 1940 |
| 2,430,769 | Hutchinson | Nov. 11, 1947 |